March 28, 1967 W. D. URBAN 3,311,740
SWITCHING APPARATUS FOR CONTROLLING THE INPUT CIRCUIT OF AN ANALOG INTEGRATOR
Filed Sept. 3, 1963
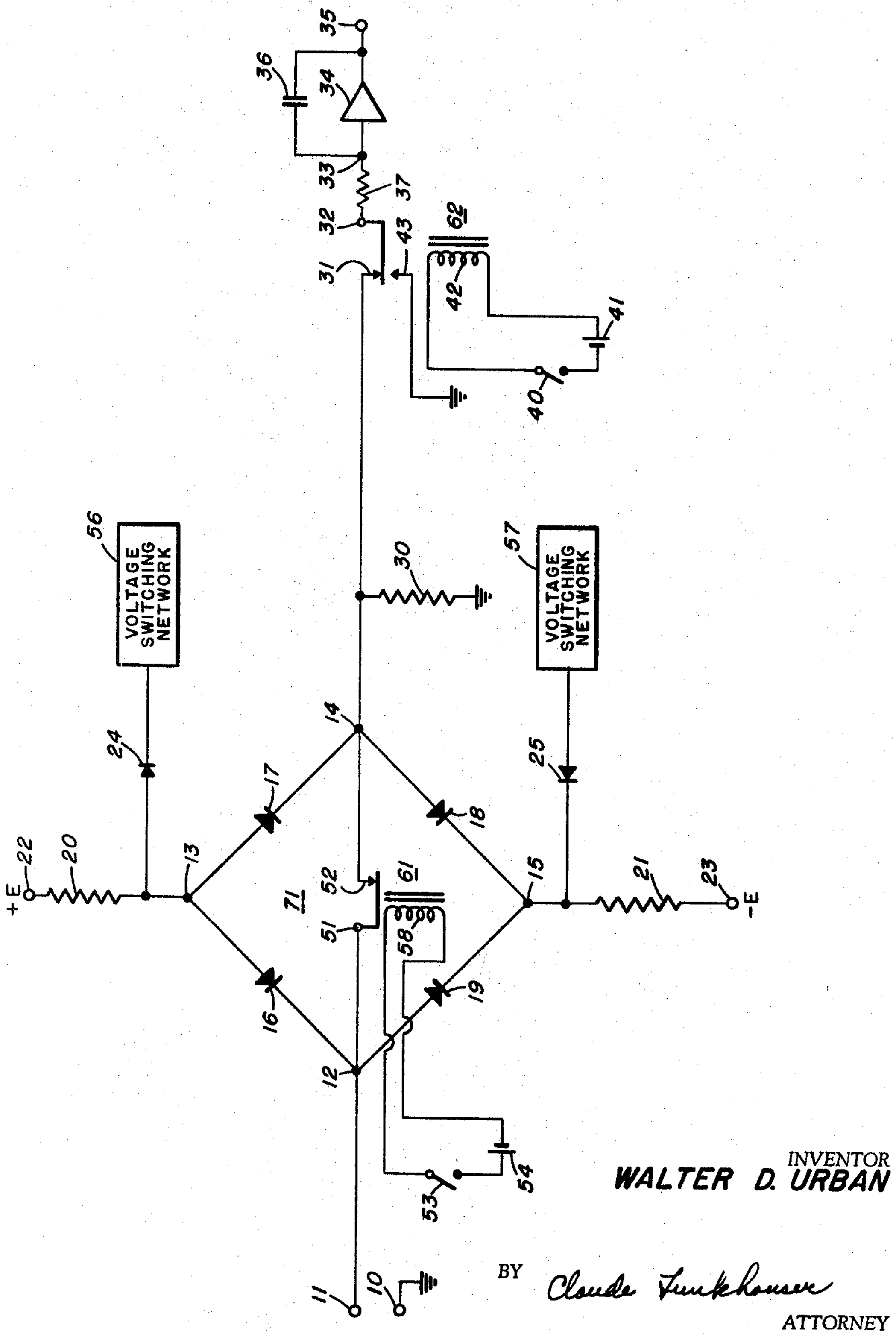
INVENTOR
WALTER D. URBAN
BY Claude Funkhouser
ATTORNEY 3,311,740

SWITCHING APPARATUS FOR CONTROLLING THE INPUT CIRCUIT OF AN ANALOG INTEGRATOR

Walter D. Urban, Silver Spring, Md., assignor to the United States of America as represented by the Secretary of the Navy Filed Sept. 3, 1963, Ser. No. 306,399
4 Claims. (Cl. 235—183)

The invention described herein may be manufactured and used by or for the Government of the United States of America for governmental purposes without the payment of any royalties thereon or therefor.

This invention relates to analog computers and more particularly to an apparatus and method for providing a rapid switching technique for use with relays.

In analog computers it is often necessary to halt the computational process. During these periods of non-computation, the analog quantities present in various stages of the computer must be preserved or stored by various techniques so that they are equal or fairly close to their original values whenever the computational process continues. Action such as this is necessary in order to maintain computer accuracy.

Although all the component computer circuits must maintain analog voltage quantities with a high degree of accuracy, integration circuits have been found to be the most troublesome in this respect. Integration circuits are greatly susceptible to poor charge storage since it is difficult to maintain a charge on the feedback capacitance used in these circuits. Normally, a relay in the input circuit to the integrator is used to positively provide either an open or grounded circuit input condition, thus preventing leakage of the voltage stored on the capacitor.

In prior computing systems the use of a relay in the input circuit to the integrator was quite satisfactory because of the relatively short time required for it to release or lock-up, with respect to the inherent time constant of the integrator circuit. However, in present applications, where integrator time constants are relatively short, the relay lock-up time is no longer an insignificant factor and relays with shorter time constants are necessary to maintain accurate computer operation.

Accordingly, the present invention is to provide a circuit to aid in latching and releasing a relay so that the inherent time constant of the relay does not interfere with the proper operation of associated computer circuits whenever a storage condition is necessary.

An object of this invention is to provide circuitry to overcome the disadvantage of a relay used in computer storage circuits while retaining the relay's advantages.

Another object of this invention is to provide a relay to open or ground the input of an integrator circuit without having the time constant of the relay interfere with the time constant of the integrator.

A further object is the provision of a circuit to aid in the latching and release of a relay.

Another object of this invention is to provide a circuit that makes feasible the use of relays in computer storage circuits.

Another object of this invention is to provide a technique for use with a diode bridge circuit that prevents inaccuracies in signal voltage transmission through the bridge switch due to impedance loss in the bridge circuit during computation.

A further object of this invention is the provision of a method to aid in the latching and releasing of relays.

Other objects, advantages and novel features of the invention will become apparent from the following detailed description of the invention when considered in conjunction with the accompanying drawings wherein:

The figure shows a schematic circuit of the precise rapid latching and release circuit.

Referring now to the sole figure of the drawing, there is shown a schematic diagram of the invention. The analog input voltage to be delivered to an integrator circuit is connected to terminals 10 and 11, while terminal 11 is in turn connected to bridge junction 12. A bridge assembly 71 is formed by four diodes 16, 17, 18 and 19 connected between bridge junctions 12, 13, 14 and 15, respectively. Unidirectional device 16 is connected at the cathode side to junction 12 and connected at the anode side to junction 13. A current limiting resistor 20 is connected from bridge junction 13 to a positive source of potential 22. Also, tied to bridge junction 13 is the anode of a diode 24 which has the cathode side connected to a voltage switching network 56. Diode 17 has its anode side tied to bridge junction 13 and the cathode side connected to bridge junction 14. Diode 18 has the anode side tied to terminal 14 and the cathode side connected to junction 15. Bridge diode 19 is connected to junction 12 by the anode and to junction 15 by the cathode side. Also connected to junction 15 is a current limiting resistor 21 which has its other side tied to a source of negative potential 23. A diode 25 is tied at its cathode side to junction 15 and has its anode side tied to voltage switching network 57. A relay 61 having a terminal 51 and a contact 52 is connected between bridge junction 12 and bridge junction 14. The relay contact 52 of relay 61 provides a means to short circuit bridge junction 12 to bridge junction 14. Relay 61 has an energizing circuit comprising a coil 58 connected to a switch 53 which in turn is connected to one side of a source potential 54, the other side of potential 54 being connected to the other side of relay coil 58. As relay 61 is energized by closing switch 53, relay contact 52, which is normally closed, opens.

A load resistor 30 connected to bridge junction 14 provides a constant output impedance for the bridge circuit output voltage; one side of load resistor 30 being connected to ground potential. Also connected to junction 14 is a normally closed relay contact 31 of relay 62. The other relay contact 43 which is normally open, is tied to ground potential. The energizing circuit of relay 62 comprises one side of relay coil 42 connected through a switch 40 to one side of a source of potential 41. The other side of potential source 41 is connected to the other side of relay 42, thus, providing energization of relay 62 upon closing switch 40 to thereby connect terminal 32 to ground potential. Relay terminal 32 is connected to the integrator input resistor 37 which in turn is connected to operational amplifier 34. A capacitor feedback impedance 36 is fed from the output terminal 35 of the operational amplifier 34 to the input of the operation amplifier 34 at terminal 33.

In operation, the diode bridge assembly generally designated as 71 is used in conjunction with relay 61 for providing electronic switching of analog signals to an integrator circuit. The bridge assembly 71 has two operational conditions, that of being in a conductive or "closed" state presenting a low impedance to the analog input signals and that of being in the non-conductive or "open" state presenting a high impedance to the analog input signals. The diode bridge assembly 71 may be considered as a single pole switch having two conduction paths, the first conduction path being from bridge junction 12, through diode 16 and 17 to the bridge output terminal 14. The second conduction path is from bridge junction 12 through adjacent bridge arms containing diode 18 and 19, respectively, to the bridge output terminal 14. The switching time required for the bridge assembly 71 to change from the conducting state to the non-conducting state can be made very short, while the impedance change from the conducting state to the non-conducting state changes from 50 ohms to many million ohms. Therefore, uni-directional devices can be arranged as a bridge switching circuit and may readily be used in the input circuit to an integrator for providing fast and positive switching action.

Consider now the action of the diode bridge switch 71 and associated relays 61 and 62, respectively, whenever a "closed" bridge condition exists. Due to the polarity of the voltage impressed across terminals 22 and 23, the bridge diodes 16, 17, 18 and 19 are forwardly biased and the bridge will be in the conductive state. When this condition exists, the junctions 12 and 14 are substantially at the same electrical potential since the forward impedance of the diodes 16, 17, 18 and 19 are low, the impedance "seen" by the analog input voltage is negligible and for all practical purposes a low impedance conduction path exists from terminal 12 to terminal 14. Therefore, the amplitude of the analog voltage impressed across load resistor 30 and the input terminal 32 to the integrator circuit, will be substantially the same value as the analog voltage impressed across the input terminals 10 and 11. The accuracy of the transmission of the analog voltage through the bridge 71 depends to a great extent upon the diodes connected by the terminals 12, 13 and 14 and the diodes connected by the terminals 12, 15 and 14. These diodes must be chosen with impedance characteristics which match one another. Since it is difficult to accurated match diodes so as to achieve the above result, the bridge circuit 71 is provided with a relay 61 to positively short circuit terminal 12 to terminal 14, thereby minimizing possible errors which may be introduced in the analog signal whenever it is being transmitted through the bridge circuit 71. The clamping diodes 24 and 25 are non-conductive since their respective voltage switching circuits 56 and 57 supply voltages of a proper polarity for back biasing. The current limiting resistors 20 and 21 merely control the amount of current traveling through the respective bridge arms and thereby control the operating points of the bridge diodes 16, 17, 18 and 19, respectively.

Turning now to the action of diode bridge switch and associated relays 61 and 62, respectively, whenever the diode bridge circuit 71 is to be shifted to the non-conductive or "open" state. As switch 53 is closed, relay coil 58 is energized, thereby opening contact 52 to permit the diode bridge circuit 71 to transmit the analog voltage signal alone. Whenever the bridge circuit 71 is to be opened, voltage switching networks 56 and 57, respectively, are operated simultaneously to impress a negative voltage on diode 24 and a positive voltage on diode 25. As the polarity of the voltage on diodes 24 and 25 changes, diodes 24 and 25 become forwardly biased and start to conduct. The current flow through diodes 24 and 25 cause the voltage across the bridge terminals 13 and 15 to be set to a value that will cause the bridge diodes 16, 17, 18 and 19, respectively, to revert to a non-conducting state and "open" the bridge. Analog voltage transmission through the bridge will cease at this time and the potential of terminal 14 will approach zero. Since it is difficult to reach zero potential at terminal 14 because of variations of current flow in the bridge circuit 17 which are caused by differences in the back conductance characteristics of the diodes, relay 62 is used to positively open the output of the bridge circuit 71 upon closure of switch 40. Due to the positive disconnection of the integrator circuit from the bridge switch 71 obtained by opening relay contact 31, reverse current leakage present in the bridge circuit due to improper matching of the diodes in adjacent bridge arms cannot cause errors to be introduced in the integrator circuit.

Various other integrator input circuit configurations are possible by wiring the relay contacts 31 and 43 differently. One such example, of a wiring change is to have relay contact 43 open rather than grounded so that instead of the integrator input being at ground potential during bridge "open" conditions it would be open circuited. Another would be to have both the bridge switch 71 and the input circuit terminal 33 connected to ground potential upon energization of relay 62.

In summary, the complete general operation of the circuit is as follows: As the analog computation is proceeding and the bridge is in the "closed" state, relays 61 and 62 are closed and analog voltage quantities are being transmitted through the bridge for processing by the integrator. At least one millisecond before the computation process is to be stopped, relay 61 is energized thereby opening the short circuit existing on the bridge thus permitting the bridge to transmit the analog signals alone. At the precise instant the computation process is to be stopped, within one microsecond, the voltage switching networks 56 and 57, respectively, are operated to cause clamping action at bridge terminals 13 and 15, respectively, to "open" the bridge to stop transmission of analog signals. Relay 62 is energized at the same instant as the voltage switching circuits 56 and 57 to open the input circuit to the integrator at relay terminal 32. Shortly before starting the computation process, the bridge is put into the "open" condition and relay 62 is de-energized. At a predetermined time later, sufficiently long to allow contacts 31 and 32 of relay 62 to close, the bridge may be set in the "closed" condition and relay 61 de-energized. Therefore, the diode bridge circuit 71 can effectively be used to aid in shortening the time constant during the latching and releasing of relay 61.

Obviously, many modifications and variations of the present invention are possible in the light of the above teachings. It is therefore to be understood that within the scope of the appended claims the invention may be practiced otherwise than as specifically described.

What is claimed is:

1. In an integrating circuit, wherein a controlled relay is used to positively connect and disconnect an input circuit of an integrator without affecting the storage signal on the integrator by the relatively slow time constant of said relay, the circuit combination comprising:

first means for receiving a signal for transmission to the integrator circuit;

a switch means with a conducting and nonconducting state coupled to the first means for allowing passage of said signal in the conducting state;

said switch means being arranged with four semiconductor diodes to form a bridge with input and output terminals, the input terminal coupled to the said first means;

said bridge arranged for being in a conducting state by having a source of potential impressed across a first and second bridge terminal for causing the said semiconductor diodes to be in a forwardly biased condition for permitting a current flow;

a current limiting means coupled to each of said first and said second bridge terminals for allowing flow of a fixed source of current through said bridge;

a first and second clamping means coupled to said current limiting means for selectively controlling said source of potential to change said switch means to a non-conducting state;

a first relay means coupled to said bridge output terminal and selectively controlled for operation whenever said bridge changes from conducting to a non-conducting state.

2. An integrating circuit comprising:

input terminals for receiving an analog input voltage to be integrated;

said integrating circuit having a capacitive integrating impedance;

a first relay means having normally closed contacts connected to said input terminals of said integrating circuit for selectively providing paths for said integrating signal;

said first relay having first and second contact means;
said first contact means being connected to the output terminal of a bridge network including four arms;
first, second, third and fourth unidirectional elements connected in said arms respectively;
said first and second uni-directional elements interconnected at their anodes;
said third and fourth uni-directional elements interconnected at their cathodes;
a bridge input terminal formed by the connection of said first uni-directional element cathode connected to said fourth uni-directional element anode;
a bridge output terminal formed by the connection of said second uni-directional element cathode to said third uni-directional element anode;
a fifth uni-directional element and a potential connected to the junction of the anodes of said first and second uni-directional elements for providing a biasing means at predetermined times;
a sixth uni-directional element and a voltage connected to the junction of the cathodes of said third and fourth uni-directional elements for providing a biasing means at predetermined times;
a second relay means with contacts connected from bridge input terminal to bridge output terminal for short circuiting the bridge at selected times whenever conducting bridge condition exists, whereby
halting of the analog voltage to the integrator is caused by first de-energizing said first relay for removing the short circuit from said bridge circuit and at a predetermined time later stopping conduction of the diode bridge by said fifth and sixth uni-directional elements.

3. An integrating circuit comprising:
input terminals for receiving an input voltage to be integrated;
said input terminals connected to a bridge network including four arms;
first, second, third and fourth terminals defining each arm of said bridge network;
a first unidirectional conducting device connected between said first and second terminals;
a second unidirectional conducting device connected between said second and third terminals;
a third unidirectional conducting device connected between third and fourth terminals;
a fourth unidirectional conducting device connected between said first and fourth terminals;
a first biasing circuit connected to said second terminal;
a second biasing circuit connected to said fourth terminal;
said first and second biasing circuits applying a fixed potential for allowing conduction and non-conduction of said input voltage from said first terminal to said third terminal;
a first relay provided with a first and second contact connected between said first terminal and third terminal;
said first relay being normally closed for providing a short circuit to said bridge when a signal is being conducted therethrough;
a second relay provided with first and second contacts connected between said third terminal and an integrating amplifier input terminal;

said second relay contacts providing a positive circuit to ensure that no error occurs during circuit holding operation; and
relay energizing means for said first and said second relays for energizing and de-energizing said first and second relays upon command;
whereby upon stopping the input voltage the first relay is energized to open the first and second contacts allowing the bridge to conduct the input signal through the bridge arms from the first terminal to the third terminal and at the precise time the computation is to be stopped the biasing circuits bias the bridge arms off for providing non-conduction of the input signal through the bridge arms.

4. In an integrating input circuit that uses relay switching means for positively controlling said input circuit the combination comprising:
an input and an output terminal;
said input terminal coupled to a bridge switching circuit formed by four unidirectional devices;
said unidirectional devices conducting current from a first bridge junction to a second bridge junction when said unidirectional devices are forwardly biased;
a first fixed value of potential at said first and said second bridge junctions for maintaining the said unidirectional devices in a conducting state for transmitting signals therethrough;
a first relay with contacts connected from bridge input terminal to bridge terminal output for short circuiting the bridge at selected times whenever a conducting bridge condition exists;
a second relay means coupled to the bridge output terminal for receiving said signals and for selectively controlling said signals to an input circuit of an integrator;
a first clamping network connected to said first bridge junction;
a second clamping network connected to said second bridge junction;
each of said clamping networks including a diode and a voltage switching network;
said diode in said clamping network controlled by said voltage switching networks to change said first fixed potential to a second fixed potential to render said unidirectional devices non-conductive; and
first and second bridge energizing means for providing said first relay to be selectively opened shortly before said bridge conduction stops and said second relay to be selectively opened shortly after the bridge conduction stops.

References Cited by the Examiner

UNITED STATES PATENTS 3,075,086 1/1963 Mussard ---------- 307—88.5

OTHER REFERENCES

Brubaker, "Precision Analog Memory Has Extended Frequency Response," Electronics, September 29, 1961, p. 141.

MALCOLM A. MORRISON, *Primary Examiner.*

K. W. DOBYNS, I. KESCHNER, *Assistant Examiners.*